(12) United States Patent
Nicholson et al.

(10) Patent No.: US 11,048,931 B2
(45) Date of Patent: Jun. 29, 2021

(54) RECOGNITION BASED HANDWRITING INPUT CONVERSION

(71) Applicant: Lenovo (Singapore) Pte. Ltd., Singapore (SG)

(72) Inventors: John Weldon Nicholson, Cary, NC (US); Daryl Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 108 days.

(21) Appl. No.: 16/279,637

(22) Filed: Feb. 19, 2019

(65) Prior Publication Data

US 2020/0265223 A1 Aug. 20, 2020

(51) Int. Cl.
*G06K 9/00* (2006.01)
*G06F 3/0484* (2013.01)
*G06K 9/62* (2006.01)

(52) U.S. Cl.
CPC ..... *G06K 9/00402* (2013.01); *G06F 3/04847* (2013.01); *G06K 9/6228* (2013.01)

(58) Field of Classification Search
None
See application file for complete search history.

(56) References Cited

U.S. PATENT DOCUMENTS

| | | | | |
|---|---|---|---|---|
| 2003/0007018 A1* | 1/2003 | Seni | ..... | G06F 3/0237 715/864 |
| 2003/0189603 A1* | 10/2003 | Goyal | ..... | G06F 40/232 715/863 |
| 2005/0128181 A1* | 6/2005 | Wang | ..... | G06K 9/00436 345/156 |
| 2006/0092138 A1* | 5/2006 | Kim | ..... | G06F 3/04842 345/173 |
| 2010/0238195 A1* | 9/2010 | McGee | ..... | G06F 3/04883 345/634 |
| 2012/0117506 A1* | 5/2012 | Koch | ..... | G06F 3/04886 715/773 |
| 2015/0286886 A1* | 10/2015 | Wimmer | ..... | G06K 9/66 382/173 |
| 2015/0356360 A1* | 12/2015 | Wimmer | ..... | G06F 3/044 382/189 |
| 2016/0170625 A1* | 6/2016 | Zambetti | ..... | G06F 3/0488 715/771 |
| 2016/0179764 A1* | 6/2016 | Kelso | ..... | G06F 3/04883 715/244 |
| 2016/0180161 A1* | 6/2016 | Novak | ..... | G06T 11/60 382/189 |
| 2016/0274761 A1* | 9/2016 | Alonso Ruiz | ..... | G06F 3/0416 |
| 2017/0060406 A1* | 3/2017 | Rucine | ..... | G06K 9/00402 |

(Continued)

*Primary Examiner* — Delomia L Gilliard
(74) *Attorney, Agent, or Firm* — Ference & Associates LLC (57) ABSTRACT

One embodiment provides a method, including: receiving, at an information handling device, an indication to convert handwriting input to machine typeset, wherein the handwriting input comprises one or more handwriting objects; determining, using a processor, a recognition confidence level for each of the one or more handwriting objects; and converting, response to the determining, each of the one or more handwriting objects having a recognition confidence level above a predetermined confidence threshold to one or more corresponding machine typeset words. Other aspects are described and claimed.

20 Claims, 5 Drawing Sheets

(56) References Cited

U.S. PATENT DOCUMENTS

| | | | |
|---|---|---|---|
| 2017/0109578 A1* | 4/2017 | Bednarowicz | G06F 40/205 |
| 2017/0235483 A1* | 8/2017 | Alonso Ruiz | G06F 3/04845 |
| | | | 715/773 |
| 2017/0242581 A1* | 8/2017 | Couelier | G06F 40/274 |
| 2017/0315719 A1* | 11/2017 | Couelier | G06F 3/04886 |
| 2019/0139256 A1* | 5/2019 | Kim | H04N 5/23229 |

* cited by examiner

FIG. 5A  On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look.

FIG. 5B  On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look.

FIG. 5C  On the Insert tab, the galleries include items that are designed to coordinate with the overall look of your document. You can use these galleries to insert tables, headers, footers, lists, cover pages, and other document building blocks when you create pictures, charts, or diagrams, they also coordinate with your current document look.

FIG. 5D  On the Insert tab, the galleries include items that are designed to coordinate with the overall look of your document. You can use these galleries to insert tables, headers, footers, lists, cover pages, and other document building blocks when you create pictures, charts, or diagrams, they also coordinate with your current document look.

RECOGNITION BASED HANDWRITING INPUT CONVERSION

BACKGROUND

Information handling devices ("devices"), for example smart phones, tablets, laptop and personal computers, other electronic devices, and the like, are capable of receiving user input from a variety of different types of input methods. For instance, a user may provide handwriting input to a device using their finger, a stylus, another object, etc. Once received, handwriting input may be converted into machine typeset (e.g., text) that may be searchable by the user.

BRIEF SUMMARY

In summary, one aspect provides a method, comprising: receiving, at an information handling device, an indication to convert handwriting input to machine typeset, wherein the handwriting input comprises one or more handwriting objects; determining, using a processor, a recognition confidence level for each of the one or more handwriting objects; and converting, response to the determining, each of the one or more handwriting objects having a recognition confidence level above a predetermined confidence threshold to one or more corresponding machine typeset words.

Another aspect provides an information handling device, comprising: a processor; a memory device that stores instructions executable by the processor to: receive an indication to convert handwriting input to machine typeset, wherein the handwriting input comprises one or more handwriting objects; determine a recognition confidence level for each of the one or more handwriting objects; and convert, responsive to the determining, each of the one or more handwriting objects having a recognition confidence level above a predetermined confidence threshold to one or more corresponding machine typeset words.

A further aspect provides a product, comprising: a storage device that stores code, the code being executable by a processor and comprising: code that receives an indication to convert handwriting input to machine typeset, wherein the handwriting input comprises one or more handwriting objects; code that determines a recognition confidence level for each of the one or more handwriting objects; and code that converts, responsive to the determining, each of the one or more handwriting objects having a recognition confidence level above a predetermined confidence threshold to one or more corresponding machine typeset words.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-D) illustrates example conversion results based upon specific recognition policies.

FIG. 5(A-D) illustrates example conversion results based upon slider mechanism adjustment.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One of the primary reasons handwriting input is converted into machine typeset is that it makes the content of the handwriting input searchable (e.g., by a user, by a digital assistant, by another entity, etc.). When in this form, a user may search for a variety of different things such as key words, key phrases, etc. This can be a major benefit when a large body of handwriting input (e.g., a semesters worth of notes, a handwritten short story or novel, etc.) is converted into machine typeset.

The capability of a device or system to accurately convert handwriting input to corresponding machine typeset is largely dependent on the quality of the original handwriting input. Stated differently, the nicer and clearer the original handwriting input is the more accurate the machine typeset will be. Oftentimes, when using handwriting input as a primary input means (e.g., to take notes, schedule reminders, make lists, etc.), a user may be more concerned about capturing the content of the moment rather than ensuring that their handwriting is the clearest. Accordingly, the quality of the resulting handwriting input in many situations may not be the best, which may negatively affect the accuracy of the conversion. As a result, an abundance of false positives (i.e., situations where a handwriting word is not converted correctly produces a positive match to a keyword search) and/or false negatives (i.e., situations where a handwriting word is not converted correctly and does not show up in the search) tend to occur.

Current solutions attempt to convert all of the handwriting input into machine typeset. This type of aggressive recognition can, depending on the quality of the handwriting input, have a low conversion accuracy of about 70%. For example, it would not be unusual if the handwriting phrase "The quick brown fox jumps over the lazy dog" was converted into the machine typeset "The quick brown fox jumps our Hb lazy dog". Another issue is that this method attempts to make the notes searchable without giving any indication regarding what searchable information was able to be accurately extracted from the notes. In fact, most technologies that make handwritten notes searchable do not give any feedback about what handwriting was recognized, what the confidence level was in the conversion, etc. This creates difficulty for a user because the only way they would know if something was searchable was if they tried to search for it.

Accordingly, an embodiment may convert handwriting words with a determined recognition confidence level above a predetermined threshold into corresponding machine typeset. In an embodiment, a command to convert handwriting input to machine typeset may be received at a device. The handwriting input may comprise one or more handwriting objects (e.g., words, punctuation marks, etc.). An embodiment may then determine a recognition confidence level for each of the handwriting objects and thereafter only covert those handwriting objects into corresponding machine typeset words that have a recognition confidence level above a predetermined confidence threshold. A user may adjust the predetermined threshold confidence by utilizing a particular recognition conversion policy or by utilizing a slider mechanism or equivalent thereof. Such a method may reduce or eliminate the occurrence of false positives and also ensures that only those handwriting objects that can be recognized to a user's desired recognition standard are converted into searchable machine typeset.

The illustrated example embodiments will be best understood by reference to the figures. The following description is intended only by way of example, and simply illustrates certain example embodiments.

Figure 1:
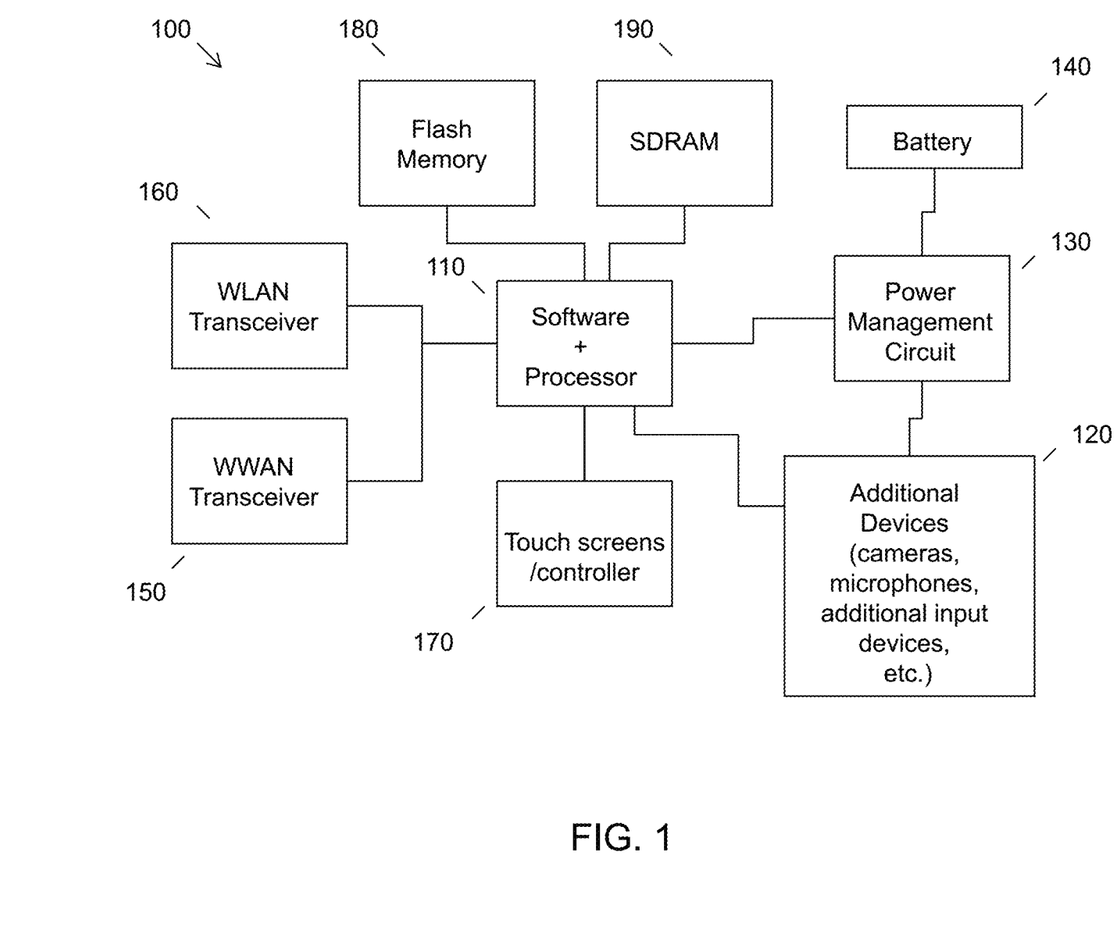
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
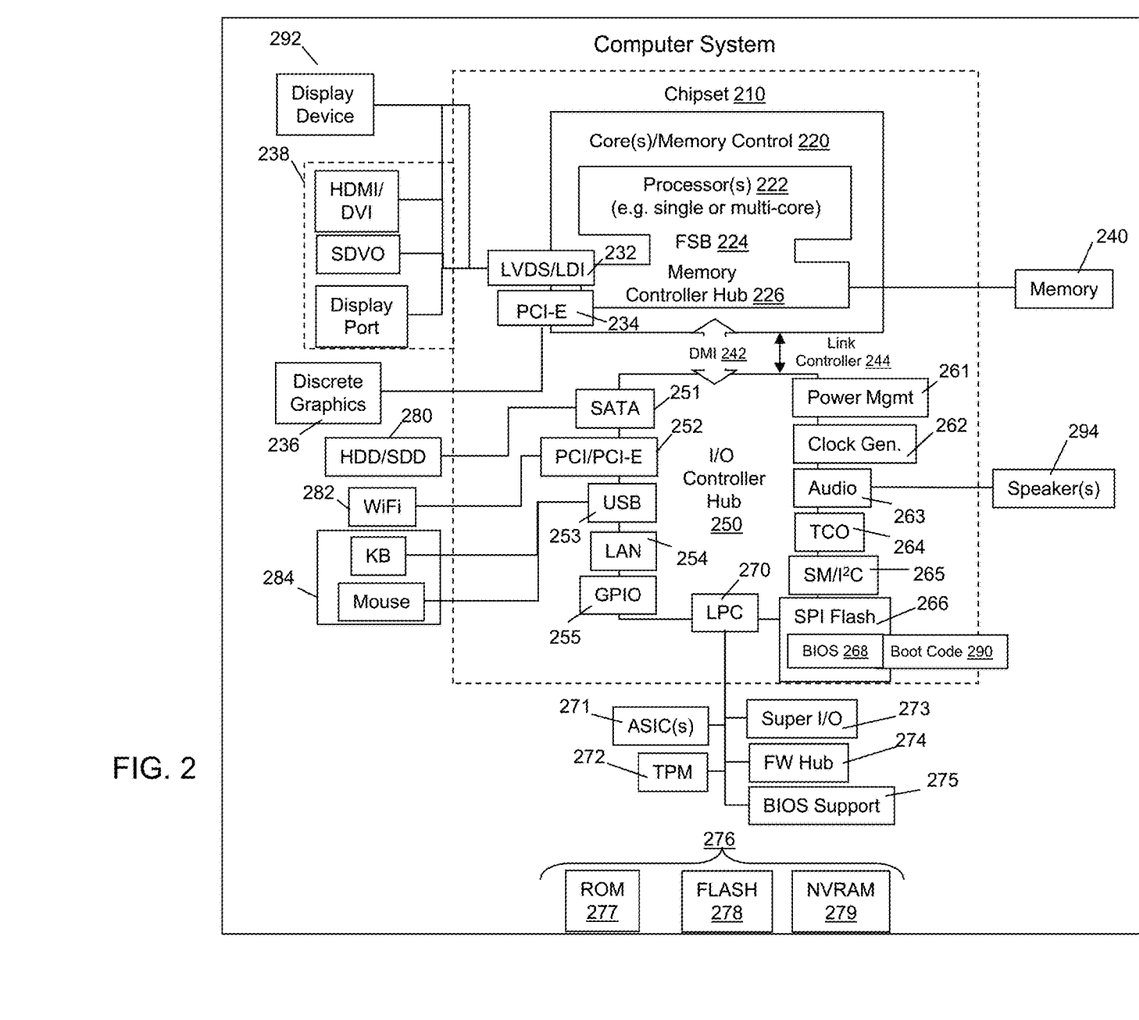
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, televisions, personal computer devices generally, and/or electronic devices that are capable of receiving handwriting input and converting that handwriting input into corresponding machine typeset. For example, the circuitry outlined in FIG. 1 may be implemented in a tablet or smart phone embodiment, whereas the circuitry outlined in FIG. 2 may be implemented in a laptop.

Figure 3:
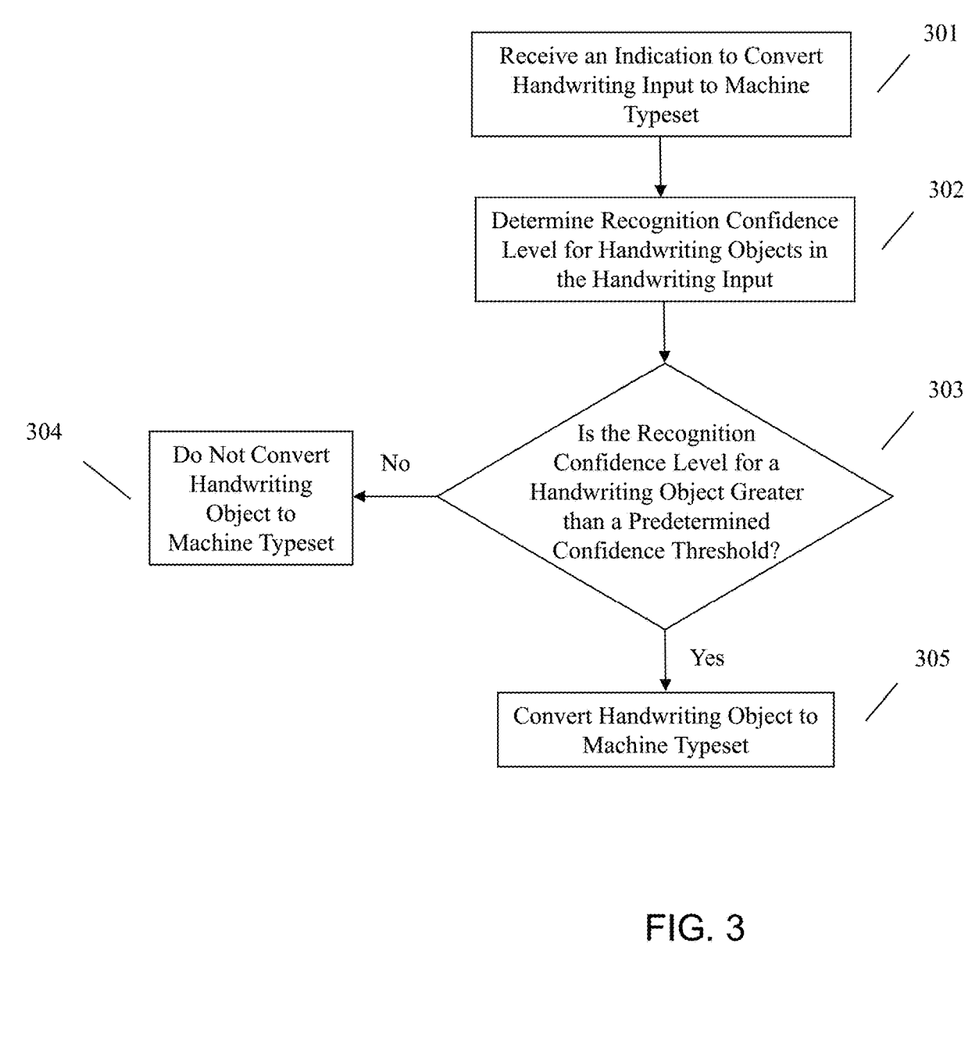
FIG. 3 illustrates an example method of converting handwriting input into machine typeset.

Referring now to FIG. 3, an embodiment may convert handwriting input having a recognition confidence level above a predetermined threshold into machine typeset. At 301, an embodiment may receive an indication to convert handwriting input into machine typeset. In an embodiment, the handwriting input may be: a scanned handwriting document (e.g., scanned handwritten notes, etc.), handwriting input provided by a user directly onto the device (e.g., using a finger, stylus, other handwriting means, etc.), another type of handwriting document received through other means, and the like. In an embodiment, the handwriting input may comprise a plurality of handwriting objects (e.g., words, punctuation marks, etc.). An embodiment may segment the handwriting input into handwriting objects by using one or more conventional handwriting object recognition techniques.

Figure 5A:
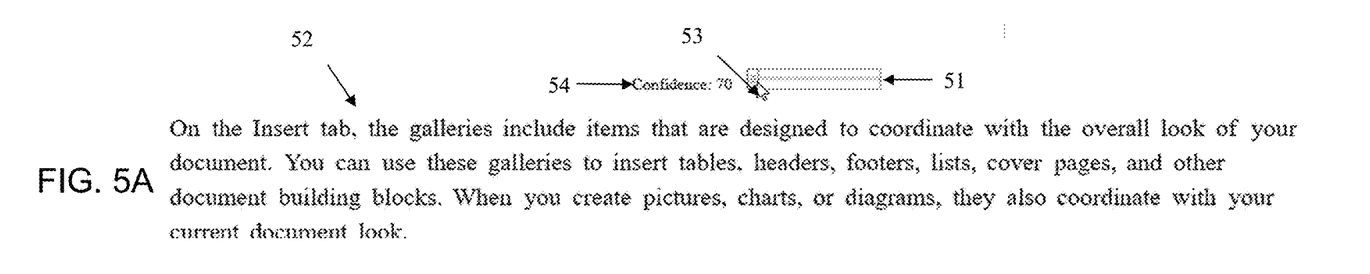
Figure 5B:
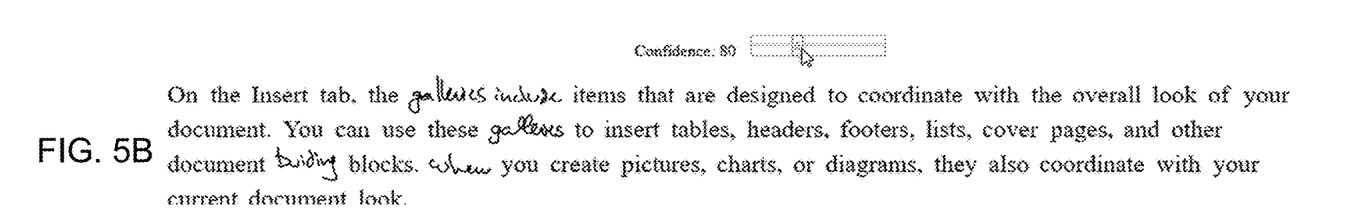
Figure 5C:
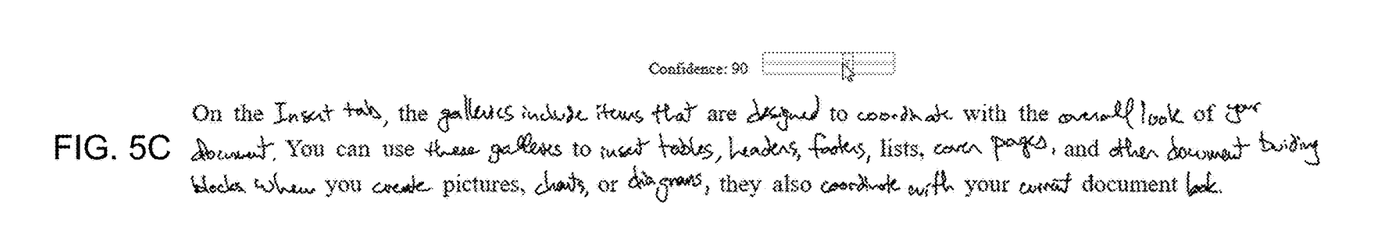

In an embodiment, the indication may be associated with a user command to convert the handwriting input into machine typeset. The user command may be provided by virtually any input means (e.g., touch input, keyboard input, mouse input, stylus input, voice input, gesture input, etc.) and received or detected by one or more appropriate input devices integrally or operatively coupled to the device (e.g., touch-based display, keyboard/mouse, audio capture device, image capture device, video capture device, etc.). As a non-limiting example, a user may select, using touch input, a "convert" button displayed on a touch screen that is configured to convert a relevant handwriting document into corresponding machine typeset. As another non-limiting example, a user may interact with a slider mechanism (as illustrated in FIG. 5(A-C)) to toggle conversion. Further detail regarding the slider mechanism will be provided further herein.

At 302, an embodiment may determine a recognition confidence level for each of the one or more handwriting objects. In the context of this application, a recognition confidence level may be an indication regarding how confident a system is about the identity of a handwriting object. An embodiment may determine the recognition confidence level by utilizing one or more conventional object identification techniques.

Responsive to determining, at 303, that the recognition confidence level for a handwriting object is less than a predetermined confidence threshold, an embodiment may not, at 304, convert the handwriting object to machine typeset. Conversely, Responsive to determining, at 303, that the recognition confidence level for a handwriting object is equivalent to or above a predetermined confidence threshold, an embodiment may, at 305, convert the handwriting object into corresponding machine typeset. In an embodiment, the predetermined confidence threshold may be set by a manufacturer/programmer or adjusted by the user, adjusted by the application, etc. Regarding the latter, a user may adjust the predetermined confidence threshold using a variety of techniques. For example, the predetermined confidence threshold may be adjusted based upon a recognition policy instituted by the user. In another example, a user may utilize an adjustment mechanism such as a slider (as illustrated in FIGS. 5A-5D), a rotatable dial (not illustrated), selectable up/down arrows (not illustrated), other equivalent thereof, etc. to adjust the predetermined confidence threshold. In another embodiment, an application may automatically attempt to institute different predetermined confidence thresholds and report back to the user the percentage of handwriting objects converted at each threshold level. An application according to this embodiment may thereafter allow a user to decide which threshold to use. For example, an application of the foregoing may report that at a predetermined confidence threshold of 60 percent, all of the handwriting input was converted whereas a predetermined confidence threshold level of 90 percent results in a conversion of only 75 percent of the handwriting input. The aforementioned techniques will now be described in more detail.

Referring now to FIGS. 4(B-D), a plurality of methods of conducting the conversion from handwriting input to machine typeset are illustrated. In each of the illustrated examples, an embodiment may attempt to convert the handwriting input sample, "The quick brown fox jumps over the lazy dog", which is illustrated at FIG. 4A, into corresponding machine typeset.

Figure 4A:
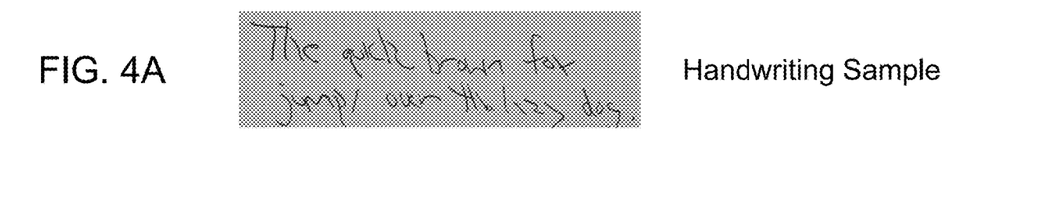
Figure 4B:
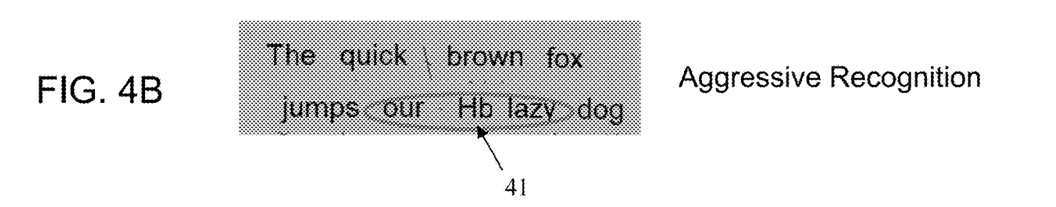

At FIG. 4B, an embodiment may adopt an aggressive recognition policy. In such an embodiment, the predetermined confidence threshold may be set to its lowest threshold level (e.g., ~70% accuracy, etc.). In this situation, an embodiment may convert all, or nearly all, of the handwriting objects into machine typeset because the system does not need to have much confidence in its object identity determination. Accordingly, the resulting machine typeset may contain one or more errors. For example, at 41, what should have been "over the lazy" was erroneously converted to "our Hb lazy". Such an embodiment may be useful for users that are not as worried about false positives in search results, users that want a uniform aesthetic in their final document, etc.

Figure 4C:
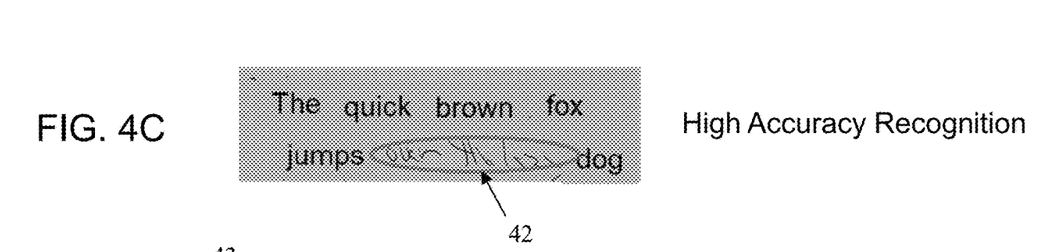

At FIG. 4C, an embodiment may adopt a high accuracy recognition policy. Such a policy may be the converse of the aggressive recognition policy. More particularly, in an embodiment, the predetermined confidence threshold in this policy may be set to its highest threshold level (e.g., ~99% accuracy, etc.). In this situation, an embodiment may only convert handwriting objects into machine typeset if a system has high confidence in the identity of the handwriting object. As a result, many handwriting objects likely will not be converted into machine typeset. For example, at FIG. 4C, it can be seen that an embodiment only converted a portion of the handwriting sample into machine typeset. In the example, the portion at 42 remained unconverted because the recognition confidence level for the words in the portion 42 did not rise to the level of the predetermined confidence threshold. Such an embodiment may be useful for users that want to eliminate occurrence of false positive/negative search results.

Figure 4D:
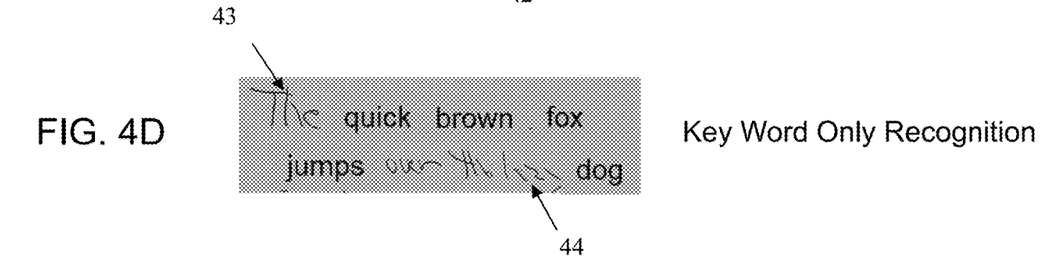

At FIG. 4D, an embodiment may adopt a keyword only recognition policy. Such a policy may only convert keywords (e.g., certain nouns, verbs, adjectives, etc.) whose confidence recognition values match or exceed a predetermined confidence threshold while skipping over filler words (e.g., words such as "the", "a", "that", etc.). In this policy, the filler words can be left as handwriting objects, hidden, shown in a different color, generally ignored, etc. In an embodiment, the predetermined confidence threshold of this policy does not need to be set at either extreme, but rather, may be set to virtually any accuracy level a user desires. An underlying concept of such a policy is to de-emphasize the filler words so that a user's attention can be drawn to the problem/low-confidence areas, while at the same time also drawing attention to the typeset words that a system thinks it recognized with a high confidence. Additionally, eliminating filler words also improves search speeds because a system does not need to analyze these words while conducting the search. In an embodiment, keywords may be identified and differentiated from filler words by first referring to an accessible database (e.g., stored locally, on the device, or remotely, on another device or server, etc.) that comprises a listing of known keywords and/or filler words and thereafter determining whether a word in the handwriting input corresponds to a word in the list(s). As an example of the foregoing, at FIG. 4D, it can be seen that an embodiment has converted the handwriting objects "quick", "brown", "fox", "jumps", and "dog" into machine typeset while leaving the filler words "the", "over", and "lazy" as unconverted handwriting objects. It is important to note that although the word "the", at 43, may have a recognition confidence level above a predetermined confidence threshold, it has been determined to be a filler word so it remains unconverted. Similarly, although the word "lazy", at 44, may generally be considered a keyword, in this situation, an embodiment determined that its recognition confidence level was below the predetermined confidence threshold so it remained unconverted.

In an embodiment, as can be seen in FIGS. 4(C-D), the machine typeset may be displayed in-line with the unconverted handwriting input objects. Additionally, in an embodiment, the unconverted handwriting objects may not be searchable while the machine typeset may be. In a further embodiment, the unconverted handwriting objects may be visually distinguished from the machine typeset (e.g., highlighted in a predetermined color, etc.). Alternatively, in another embodiment, the unconverted handwriting objects may be hidden from view so as to unclutter the screen.

Referring now to FIGS. 5(A-D), non-limiting examples of converting handwriting objects to machine typeset using a slider mechanism are illustrated. In an embodiment, a slider mechanism 51 may be visible to a user and associated with a body 52 of content. Although the example illustrations of FIGS. 5(A-D) have the slider mechanism 51 positioned above the document body 52, this is a non-limiting position and the slider mechanism 51 may be positioned at virtually any position on a display where a user may interact with it.

In an embodiment, a user may interact with the slider mechanism 51 by a variety of different type of input means (e.g., touch input, stylus input, mouse input, keyboard input, voice input, etc.). For simplicity purposes, a user may interact with the slider mechanism 51 via a cursor 53 controlled by a mouse. In an embodiment, adjustment of the slider mechanism 51 (e.g., a user may select a toggle of the mechanism using the cursor 52 and thereafter move the cursor 53 left or right, etc.) may correspondingly adjust a predetermined confidence threshold associated with the body. In an embodiment, the predetermined confidence threshold may be displayed, at 54, proximate to the slider mechanism and may dynamically change/update as the user manipulates the slider mechanism 51. As can be seen from FIGS. 5A-5D, a value associated with the predetermined confidence threshold may change (e.g., from 0 to 100 in 1 unit intervals, etc.) as the confidence requirement for conversion is increased.

Figure 5D:
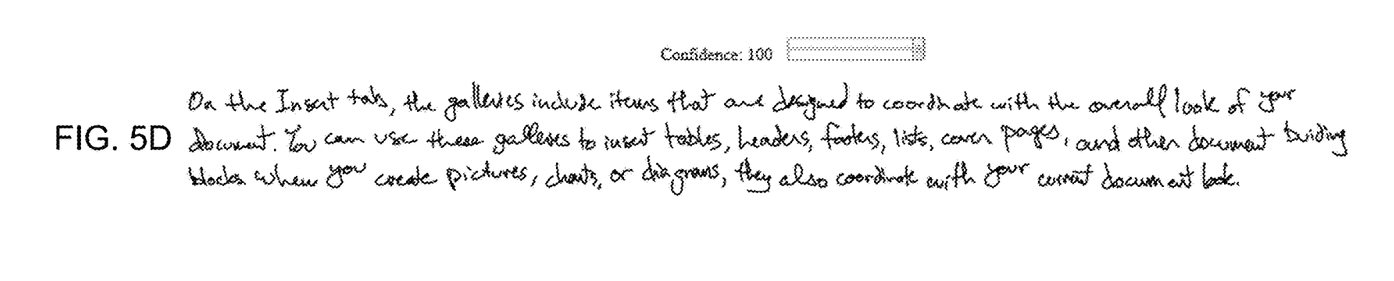

Each of the embodiments illustrated in FIGS. 5A-5D comprise different conversion proportions based upon a predetermined confidence threshold associated with the content body. For instance, at FIG. 5A, a low confidence is required to convert handwriting objects into machine typeset. Accordingly, all of the content identified as having a recognition confidence level of 70 or above is converted into machine typeset. FIGS. 5B-5C show an increased confidence requirement, which results in less of the content body being converted to machine typeset. Lastly, FIG. 5D illustrates a situation where a conversion from a handwriting object to machine typeset requires maximum confidence. Accordingly, in this situation, none of the handwriting objects are converted into machine typeset.

The various embodiments described herein thus represent a technical improvement to conventional handwriting object conversion techniques. Using the techniques described herein, an embodiment may receive an indication to convert handwriting input into machine typeset. An embodiment may then determine a recognition confidence level for each of the handwriting objects in the handwriting input and thereafter convert the handwriting objects having a recognition confidence level greater than a predetermined threshold confidence into corresponding machine typeset. A user may adjust the predetermined threshold confidence by utilizing a particular recognition policy or by utilizing a slider mechanism. Such a method may ensure that the resulting machine typeset words are faithful conversions of their handwriting object counterparts.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to convert handwriting input to machine typeset, wherein the handwriting input comprises one or more handwriting objects;
   determining, using a processor, a recognition confidence level for each of the one or more handwriting objects;
   converting, response to the determining, each of the one or more handwriting objects having a recognition confidence level above a predetermined confidence threshold to one or more corresponding machine typeset words, wherein the predetermined confidence threshold is established by a user of the information handling device; and
   maintaining each of the one or more handwriting objects convert handwriting input to machine typeset not having a recognition confidence level above the predetermined confidence threshold as the handwriting input.

2. The method of claim 1, wherein the indication is associated with a command and wherein the converting comprises converting responsive to receiving the command.

3. The method of claim 1, wherein the converting comprises converting using an adjustment mechanism.

4. The method of claim 3, wherein the converting using the adjustment mechanism comprises gradually converting the one or more handwriting objects as a toggle associated with the adjustment mechanism is manipulated by a user.

5. The method of claim 4, wherein the gradually converting comprises adjusting the predetermined confidence threshold based on the manipulation.

6. The method of claim 3, further comprising displaying the predetermined confidence threshold proximate to the adjustment mechanism.

7. The method of claim 6, further comprising dynamically adjusting a value associated with the predetermined confidence threshold responsive to manipulation of the adjustment mechanism.

8. The method of claim 1, further comprising displaying the one or more corresponding machine typeset words in-line with the one or more handwriting objects having a recognition confidence level below the predetermined confidence threshold.

9. The method of claim 1, further comprising identifying, from the one or more handwriting objects, keywords.

10. The method of claim 9, wherein the converting comprises only converting each of the keywords having a recognition confidence level above the predetermined confidence threshold.

11. An information handling device, comprising:
    a processor;
    a memory device that stores instructions executable by the processor to:
    receive an indication to convert handwriting input to machine typeset, wherein the handwriting input comprises one or more handwriting objects;
    determine a recognition confidence level for each of the one or more handwriting objects;
    convert, responsive to the determining, each of the one or more handwriting objects having a recognition confidence level above a predetermined confidence threshold to one or more corresponding machine typeset words, wherein the predetermined confidence threshold is established by a user of the information handling device; and
    maintain each of the one or more handwriting objects convert handwriting input to machine typeset not having a recognition confidence level above the predetermined confidence threshold as the handwriting input.

12. The information handling device of claim 11, wherein the indication is associated with a command and wherein the instructions executable by the processor to convert comprise instructions executable by the processor to convert responsive to receiving the command to convert.

13. The information handling device of claim 11, wherein the instructions executable by the processor to convert comprise instructions executable by the processor to convert using an adjustment mechanism.

14. The information handling device of claim 13, wherein the instructions executable by the processor to convert using the adjustment mechanism comprise instructions executable by the processor to gradually convert the one or more handwriting objects as a toggle associated with the adjustment mechanism is manipulated by a user.

15. The information handling device of claim 14, wherein the instructions executable by the processor to gradually convert comprise instructions executable by the processor to adjust the predetermined confidence threshold based on the manipulation.

16. The information handling device of claim 13, wherein the instructions are further executable by the processor to display the predetermined confidence threshold proximate to the adjustment mechanism.

17. The information handling device of claim 16, wherein the instructions are further executable by the processor to dynamically adjust a value associated with the predetermined confidence threshold responsive to manipulation of the adjustment mechanism.

18. The information handling device of claim 11, wherein the instructions are further executable by the processor to display the one or more corresponding machine typeset words in-line with the one or more handwriting objects having a recognition confidence level below the predetermined confidence threshold.

19. The information handling device of claim 11, wherein the instructions are further executable by the processor to identify, from the one or more handwriting objects, keywords and wherein the instructions executable by the processor to convert comprise instructions executable by the processor to only convert each of the keywords having a recognition confidence level above the predetermined confidence threshold.

20. A product, comprising:
a non-transitory storage device that stores code, the code being executable by a processor and comprising:
code that receives an indication to convert handwriting input to machine typeset, wherein the handwriting input comprises one or more handwriting objects;
code that determines a recognition confidence level for each of the one or more handwriting objects;
code that converts, responsive to the determining, each of the one or more handwriting objects having a recognition confidence level above a predetermined confidence threshold to one or more corresponding machine typeset words, wherein the predetermined confidence threshold is established by a user of the information handling device; and
code that maintains each of the one or more handwriting objects convert handwriting input to machine typeset not having a recognition confidence level above the predetermined confidence threshold as the handwriting input.

* * * * *